United States Patent Office 3,681,097
Patented Aug. 1, 1972

3,681,097
LOW EXPANSION ZINC PETALITE-BETA QUARTZ
GLASS-CERAMIC ARTICLES
George H. Beall, Corning, and Francis W. Martin, Painted
Post, N.Y., assignors to Corning Glass Works, Corning, N.Y.
No Drawing. Filed Aug. 19, 1970, Ser. No. 65,264
Int. Cl. C04b 33/00
U.S. Cl. 106—39 DV                        5 Claims

ABSTRACT OF THE DISCLOSURE

This invention relates to the manufacture of glass-ceramic articles exhibiting very low coefficients of thermal expansion which have compositions in the $ZnO\text{-}Al_2O_3\text{-}SiO_2$ field. The essential absence of alkali metal in the compositions endows the products of this invention with high electrical resistivity.

---

The production of glass-ceramic articles involves the carefully controlled crystallization of glass articles through heat treatment thereof. In general, the manufacture of glass-ceramic articles contemplates three steps. First, a glass-forming batch of a desired composition, to which a nucleating agent is commonly added, is melted. Second, the melt is simultaneously cooled to a glass and an article of a desired configuration shaped therefrom. Third, the glass article is exposed to a predetermined heat treating schedule to cause the crystallization in situ of relatively uniformly-sized, fine-grained crystals homogeneously dispersed in a residual glassy matrix. Normally, this heat treatment comprises two steps. First, the glass article is exposed to a temperature above the softening point of the glass to cause the growth of crystals on the nuclei.

Inasmuch as a glass-ceramic article is formed through the crystallization in situ of a glass article, it is free from voids and non-porous. Further, since a glass-ceramic article is commonly predominantly crystalline, i.e., greater than 50% by weight crystalline, the chemical and physical properties thereof are more closely akin to those of the crystal phase than those of the original glass. Finally, the residual glassy matrix has a composition quite dissimilar from that of the parent glass article because the components thereof constituting the crystals have been precipitated therefrom.

The instant invention is founded upon the discovery that certain glasses in the $ZnO\text{-}Al_2O_3\text{-}SiO_2$ composition field, when nucleated with $ZrO_2$ and/or the noble metals, can be crystallized in situ to yield glass-ceramic articles wherein zinc petalite solid solution and/or beta-quartz solid solution comprise the predominant crystal phases. Zinc petalite has been so called because the pattern thereof observed in X-ray diffraction analysis very closely approximates that of petalite ($LiAlSi_4O_{10}$). It is deemed to be a solid solution phase composed of a combination of the following species: $ZnAl_2Si_3O_{10}$, $ZnSi_2O_5$, and $ZnAl_2Si_8O_{20}$, which are zinc analogs of petalite.

In its broadest terms, the invention contemplates melting a batch for a glass consisting essentially, by weight on the oxide basis, of about 13–40% ZnO, 9–26% $Al_2O_3$, 40–75% $SiO_2$, and 3–10% $ZrO_2$ and/or 0.001–0.5% of a noble metal selected from the group consisting of copper, gold, platinum, palladium, and silver. The melt is simultaneously cooled to at least below the transformation range thereof and a glass article shaped therefrom and, thereafter, this glass article is exposed to a temperature within the range of about 775°–950° C. for a period of time sufficient in length to secure the desired crystallization in situ. The transformation range is that temperature at which a liquid melt is deemed to have become an amorphous solid, this temperature generally lying between the strain point and annealing point of the glass. Inasmuch as this crystallization is a time-temperature dependent process, at temperatures within the upper extreme of the crystallization range, short exposure periods only will be required, e.g., about one hour or even less. However, at temperatures within the cooler extreme of the crystallization range, exposure times as extended as 24–48 hours may be necessary to achieve extensive crystallization.

Where heat treating temperatures much above about 950° C. are employed, the zinc petalite and beta-quartz solid solutions will break down into such crystal phases as gahnite ($ZnO\cdot Al_2O_3$), willemite ($2ZnO\cdot SiO_2$), and cristobalite ($SiO_2$). The development of these phases destroys the very low thermal expansion character of the products. Hence, whereas these crystals may be present in the final product even when the lower heat treating temperatures are employed, the quantities thereof are so small as to have little effect upon the overall properties of the crystallized product.

The preferred heat treatment practice involves first exposing the glass article to a temperature somewhat above the transformation range, e.g., 725°–800° C., and maintaining thereat for a period of time of sufficient length to assure extensive nucleation and initiate crystal growth. Subsequently, the article is heated to about 800°–950° C. and held within that temperature range for a sufficient length of time to promote essentially complete crystal growth. In general, a nucleation time of 2–6 hours followed by a crystallization growth period of about 1–8 hours has been found to yield uniformly fine-grained, highly crystalline products.

It can be appreciated that various modifications in the manufacturing procedure are possible. For example, after the melt is cooled below the transformation range thereof and shaped to a glass article, the article may then be further cooled to room temperature to permit visual inspection of glass quality prior to beginning the heat treating operation. Nevertheless, where speed of production and fuel economies are of paramount importance, the melt may merely be quenched to a glass shape at a temperature immediately below the transformation range and the crystallization practice initiated at once.

Also, whereas a two-step heat treatment schedule is to be preferred, a satisfactorily-crystallized article can be produced when the glass shape is simply heated from room temperature or the transformation range to temperatures of 775°–950° C. and maintained within that range for a sufficient length of time to develop a highly crystalline product. Commonly, articles so-produced will not be as uniformly fine-grained as will be secured in the two-step procedure.

Finally, when the rate of heating the glass article from room temperature or the transformation range is not too rapid and the final crystallization temperature is near the upper extreme of the crystallization range, no dwell period at any one particular temperature will be required. However, inasmuch as the growth of crystals is time and temperature dependent, the rate of heating the glass article above the transformation range must not exceed the rate of crystal growth so that an insufficient number of crystals are developed to support the article. The lack of crystallization will result in deformation and slumping of the glass article when the softening point thereof is approached and exceeded. Hence, whereas heating rates of 10° C./minute and higher have been utilized successfully, particularly in instances where physical supports such as formers have been provided to inhibit deformation of the glass articles, heating rates of about 3°–5° C./minute are to be preferred. These latter heating rates have yielded articles demonstrating little, if any, physical deformation throughout the composition field composing the invention.

Table I reports compositions, expressed in weight percent on the oxide basis, of thermally crystallizable glasses which were heat treated in accordance with the method of this invention. The actual batch ingredients can comprise any materials, either oxides or other compounds, which, on being melted together, are converted to the desired oxide compositions in the proper proportions. Since the amounts of the noble metals are so minor, they are merely reported as being in excess of the base glass composition. The batch ingredients were compounded, ballmilled together to aid in securing a homogeneous melt, and then melted in open platinum crucibles for about 16 hours at temperatures between about 1500°–1600° C. Glass cane having a diameter of about ¼" were hand drawn from each melt and the remainder poured onto a steel plate to produce a circular glass patty about 5" in diameter and ½" in thickness. The glass patties were transferred immediately to an annealer operating at 650° C. The annealed patties and cane were thereafter placed in an electrically-fired furnace and subjected to the firing schedules reported in Table II. At the conclusion of each heat treatment, the electric current to the furnace was cut off and the crystallized articles either removed directly from the furnace into the ambient atmosphere or merely left within the furnace and allowed to cool to room temperature therein. This latter practice, termed cooling at furnace rate, was estimated at an average rate of cooling of about 3°–5° C./minute.

Although the above-recited amounts of $ZnO$, $Al_2O_3$, $SiO_2$, and nucleating agent are demanded to obtain a highly crystalline glass-ceramic article of essentially zero expansion with zinc petalite solid solution and/or beta-quartz as the predominant crystal phases, minor amounts of compatible metal oxides totalling not more than about 10% product. Whereas their total absence is desirable, up to about 2% by weight can be tolerated as a melting aid. Additions of the alkaline earth metal oxides MgO, CaO, and SrO should also be avoided due to their solid solution in the zinc petalite and beta-quartz phases or the development of unwanted new phases such as spinel

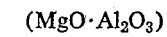

No more than about 2% of any one individually or more than 3% total of the group can be tolerated. Finally, very minor amounts of $TiO_2$ can be substituted for $ZrO_2$ as the nucleating agent but such substitution tends to favor the developement of the undesirable gahnite. $TiO_2$ is a more efficient nucleating agent than $ZrO_2$. Therefore, here again, no more than about 2% by weight can be tolerated and, preferably, at least 5% $ZrO_2$ should also be present to insure the extensive growth of zinc petalite and beta-quartz.

At least 3% $ZrO_2$ or 0.001% noble metal must be included in the glass composition to initiate sufficient nucleation therein to attain a uniformly fine-grained crystalline body. More than 10% $ZrO_2$ hazards batch melting problems and is unnecessary since the final product simply contains more crystallization of tetragonal zirconia. Amounts of noble metal in excess of 0.5% are useful and do not harm the crystallized product but are unnecessary and economically unattractive. SnO in amounts up to about 2% are frequently useful in lowering the liquids and reducing the noble metal.

The melts of the glasses recorded in Table I were quite fluid so no fining agent, as such, was required. Nevertheless, in large scale commercial melting, a conventional fining agent such as $As_2O_3$ can be added as needed. In accordance with conventional glass analytical practice, the noble metals are reported in metallic form.

TABLE I

| | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| ZnO, percent | 23.25 | 23.70 | 19.14 | 19.70 | 19.90 | 19.70 | 24.63 | 19.70 | 14.92 | 14.92 | 36.36 | 32.55 | 27.91 | 27.91 | 32.56 | 17.92 | 18.69 | 16.01 | 20.66 |
| $Al_2O_3$, percent | 23.25 | 18.95 | 14.35 | 14.78 | 14.92 | 14.78 | 19.70 | 14.78 | 19.90 | 14.92 | 13.63 | 13.95 | 18.59 | 13.95 | 9.30 | 17.92 | 16.36 | 16.01 | 18.78 |
| $SiO_2$, percent | 46.50 | 52.13 | 62.20 | 64.04 | 64.68 | 64.04 | 54.19 | 64.04 | 64.68 | 69.66 | 40.90 | 64.62 | 46.52 | 51.16 | 51.16 | 53.79 | 58.37 | 61.80 | 53.50 |
| $ZrO_2$, percent | 6.50 | 4.72 | 3.81 | | | | | | | | 9.11 | 6.98 | 6.98 | 6.98 | 6.98 | 5.39 | 3.74 | 4.74 | 5.63 |
| $As_2O_3$, percent | 0.50 | 0.50 | 0.50 | 0.50 | 0.50 | 0.50 | 0.50 | 0.50 | 0.50 | 0.50 | | | | | | 0.50 | 0.50 | 0.50 | 0.50 |
| SnO, percent | | | | | | 0.98 | | 0.98 | 0.98 | | | | | | | | | | |
| Pd, percent | | | | | 0.01 | | 0.001 | 0.003 | | | | | | | | | | | |
| Pt, percent | | | | | | 0.01 | | | | | 0.01 | 0.003 | | | | | | | |
| Au, percent | | | | | 0.003 | | 0.01 | 0.01 | | | | | | | | | | | |
| Ag, percent | | | | | | | | | | | | 0.002 | | | | | | | |
| BaO, percent | | | | | | | | | | | | | | | | 4.48 | 2.34 | | |
| BeO, percent | | | | | | | | | | | | | | | | | | 0.94 | 0.93 | by weight may be included to aid in melting the batch or to modify the chemical and/or physical properties of the crystallized body. Hence, additions of up to 6% by weight BaO are useful in stabilizing the coefficient of expansion of the products. BeO in amounts up to about 3% can be added to lower the liquidus of the melt and improve the surface quality of the final products. Also, $B_2O_3$, $P_2O_5$, and PbO are effective as fluxes but to assure good thermal stability should not exceed a total of about 5% by weight. The presence of the alkali metal oxides, e.g., $Li_2O$, $Na_2O$, and $K_2O$, should be avoided due to their extremely deleterious effect upon the dielectric properties of the final Table II tabulates the particular heat treatment schedule utilized in crystallizing each glass article to a white, fine-grained opaque or translucent, crystalline article and several measurements of coefficients of thermal expansion on the range 25°–600° C., dielectric constants and loss tangents determined at 25° C. and 1 kilocycle, electrical resistivities measured at 400° C., and identifications of the crystal phases present as determined through X-ray diffraction analyses. In each reported schedule, the temperature was raised at a rate of about 5° C./minute to the dwell temperature and the crystallized articles cooled to room temperature at furnace rate.

TABLE II

| Example No. | Heat treatment | Crystal phases | Exp. coeff. ($\times 10^{-7}/°$ C.) | Dielectric constant | Loss tangent | Log R |
|---|---|---|---|---|---|---|
| 1 | 2 hours at 800° C.<br>4 hours at 850° C. | Beta-quartz | −3.0 | 6.63 | 0.0017 | 10.8 |
| 2 | 2 hours at 800° C.<br>4 hours at 875° C. | Beta-quartz, zinc petalite | 1.0 | | | |
| 3 | 2 hours at 800° C.<br>4 hours at 875° C. | Zinc petalite | 6.0 | | | |
| 4 | 2 hours at 775° C.<br>2 hours at 825° C.<br>4 hours at 875° C. | Zinc petalite | 9.0 | | | |
| 5 | 2 hours at 775° C.<br>2 hours at 825° C.<br>4 hours at 875° C. | Zinc petalite | −5.0 | | | |
| 6 | 2 hours at 775° C.<br>2 hours at 825° C.<br>4 hours at 875° C. | Zinc petalite | 8.0 | | | |

TABLE II—Continued

| Example No. | Heat treatment | Crystal phases | Exp. coeff. ($\times 10^{-7}/°$ C.) | Dielectric constant | Loss tangent | Log R |
|---|---|---|---|---|---|---|
| 7 | 2 hours at 775° C. / 2 hours at 825° C. / 4 hours at 875° C. | Zinc petalite | 8.0 | | | |
| 8 | 2 hours at 775° C. / 2 hours at 825° C. / 4 hours at 875° C. | Zinc petalite | 9.0 | | | |
| 9 | 2 hours at 775° C. / 2 hours at 825° C. / 4 hours at 875° C. | Zinc petalite | 5.0 | | | |
| 10 | 2 hours at 775° C. / 2 hours at 825° C. / 4 hours at 875° C. | Zinc petalite | 6.0 | | | |
| 11 | 2 hours at 775° C. / 4 hours at 850° C. | | 21.5 | | | |
| 12 | 2 hours at 750° C. / 4 hours at 950° C. | | 13.7 | | | |
| 13 | 2 hours at 800° C. / 2 hours at 850° C. | Zinc petalite | 18 | | | |
| 14 | 2 hours at 800° C. / 4 hours at 825° C. | Zinc petalite | | 6.41 | 0.0016 | 8.5 |
| 15 | 2 hours at 800° C. / 4 hours at 825° C. | Beta-quartz | | 7.03 | 0.0011 | 9.0 |
| 16 | 2 hours at 700° C. / 6 hours at 860° C. | Beta-quartz, cubic ZrO$_2$ | | | | |
| 17 | 2 hours at 770° C. / 6 hours at 870° C. | Beta-quartz, cubic ZrO$_2$ | | | | |
| 18 | 2 hours at 800° C. / 2 hours at 820° C. / 4 hours at 850° C. | Beta-quartz, zinc petalite | 3.0 | | | |
| 19 | 2 hours at 800° C. / 4 hours at 850° C. | Zinc-petalite, beta-quartz | 4.5 | | | |

Tables I and II amply illustrate the composition and process parameters required for producing glass-ceramic articles according to this invention. The crystal content of the articles is greater than about 50% by weight and normally exceeds about 75% by weight, this depending upon the extent to which the components of the batch are adaptable to the formation of crystal phases. The crystals, themselves, are generally very uniformly fine-grained, substantially all being smaller than 5 microns in diameter and the vast majority being smaller than 1 micron diameter.

The preferred composition area comprises about 50–70% $SiO_2$, 15–25% $Al_2O_3$, 17–25% ZnO, 3–7% $ZrO_2$, with, optionally, up to 3% BaO with heat treatments between about 800°–925° C. being the most desirable to secure crystal assemblages consisting essentially of zinc petalite solid solution, beta-quartz solid solution, and tetragonal zirconia, only. Such products demonstrate a substantially zero expansion with excellent electrical properties.

Example I, when exposed to the heat treatment schedule reported in Table II, yields a very highly crystalline article wherein the crystals are uniformly extremely fine-grained (essentially all less than one micron in diameter), and which exhibits a high dielectric constant accompanied with a low loss tangent.

We claim:
1. A glass-ceramic article essentially free of alkali metal oxides and the alkaline earth metal oxides MgO, CaO, and SrO, exhibiting a coefficient of thermal expansion (25°–600° C.) of about −5 to +22×10$^{-7}$/° C., and wherein the crystal content thereof is greater than 50% by weight, said crystal content consisting essentially solely of crystals selected from the group consisting of zinc petalite solid solution and beta-quartz solid solution, the composition of said article being substantially the same throughout and consisting essentially, by weight on the oxide basis of about 13–40% ZnO, 9–26% $Al_2O_3$, 40–75% $SiO_2$, and a nucleating agent selected from the group consisting of 3–10% $ZrO_2$ and 0.001–0.5% of a noble metal selected from the group consisting of copper, gold, platinum, palladium, and silver.
2. A glass-ceramic article according to claim 1 wherein said article consists essentially, by weight on the oxide basis, of about 17–25% ZnO, 15–25% $Al_2O_3$, 50–70% $SiO_2$, 3–7% $ZrO_2$, and 0–3% BaO.
3. A method for making a glass-ceramic article which is essentially free of alkali metal oxides and the alkaline earth metal oxides MgO, CaO, and SrO, which exhibits a coefficient of thermal expansion (25°–600° C.) of about −5 to +22×10$^{-7}$/° C., and wherein the crystal content thereof is greater than 50% by weight, said crystal content consisting essentially solely of crystals selected from the group consisting of zinc petalite solid solution and beta-quartz solid solution, which comprises:
(a) melting a batch for a glass consisting essentially, by weight on the oxide basis, of about 15–45% ZnO, 10–28% $Al_2O_3$, 40–75% $SiO_2$, and a nucleating agent selected from the group consisting of 3–10% $ZrO_2$ and 0.001–0.5% of a noble metal selected from the group consisting of copper, gold, platinum, palladium, and silver;
(b) simultaneously cooling the melt below the transformation range thereof and shaping a glass body therefrom;
(c) subsequently exposing said glass body to a temperature between about 775°–950° C. for a period of time sufficient to crystallize said glass body in situ throughout; and then
(d) cooling the crystallized body to room temperature.
4. A method according to claim 3 wherein said glass consists essentially, by weight on the oxide basis, of about 17–25% ZnO, 15–25% $Al_2O_3$, 50–70% $SiO_2$, 3–7% $ZrO_2$, and 0–3% BaO.
5. A method according to claim 3 wherein said glass body is first exposed to a temperature between about 725°–800° C. for about 2–6 hours, thereafter exposed to a temperature between about 800°–925° C. for about 1–8 hours, and then cooling to room temperature.

References Cited

UNITED STATES PATENTS

| 3,352,698 | 11/1967 | McMillan et al. | 106—39 DV |
| 3,531,303 | 9/1970 | Bahat | 106—39 DV |
| 3,252,811 | 5/1966 | Beall | 106—39 DV |
| 3,282,711 | 11/1966 | Lin | 106—39 DV |
| 2,920,971 | 1/1960 | Stookey | 106—39 DV |

FOREIGN PATENTS

| 18,060 | 1962 | Japan | 106—39 DV |
| 6516586 | 1967 | Netherlands | 106—39 DV |

OTHER REFERENCES

Berezhnoi, A.I.; Glass-Ceramics and Photo-Sitalls; New York, 1970 (Moscow, 1966), pp. 216 and 218.

TOBIAS E. LEVOW, Primary Examiner

W. R. SATTERFIELD, Assistant Examiner

U.S. Cl. X.R.

106—52; 65—33